United States Patent
Boutami

(10) Patent No.: US 10,684,214 B2
(45) Date of Patent: Jun. 16, 2020

(54) OPTICAL CAVITY WITH STRONG DYNAMIC

(71) Applicant: COMMISSARIAT A L'ENERGIE ATOMIQUE ET AUX ENERGIES ALTERNATIVES, Paris (FR)

(72) Inventor: Salim Boutami, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 137 days.

(21) Appl. No.: 16/041,045

(22) Filed: Jul. 20, 2018

(65) Prior Publication Data
US 2019/0025191 A1 Jan. 24, 2019

(30) Foreign Application Priority Data
Jul. 21, 2017 (FR) ...................................... 17 56942

(51) Int. Cl.
  *G01N 21/03* (2006.01)
  *G01N 21/05* (2006.01)
  *G01N 21/3504* (2014.01)

(52) U.S. Cl.
  CPC ......... *G01N 21/0303* (2013.01); *G01N 21/05* (2013.01); *G01N 21/3504* (2013.01)

(58) Field of Classification Search
  CPC ............... G01N 21/0303; G01N 21/05; G01N 21/3504; G01N 21/01
  USPC .................................................. 356/445–448
  See application file for complete search history.

(56) References Cited

U.S. PATENT DOCUMENTS

| 5,767,967 A | 6/1998 | Yufa |
| 6,120,166 A | 9/2000 | Price |
| 6,194,735 B1 | 2/2001 | Martin |
| 2003/0136911 A1 | 7/2003 | Martin |

FOREIGN PATENT DOCUMENTS

| WO | 98/09152 A1 | 3/1998 |
| WO | 01/081900 A1 | 11/2001 |

OTHER PUBLICATIONS

French Preliminary Search Report dated Apr. 30, 2018 in French Application 17 56942 filed on Jul. 21, 2017 (with English Translation of Categories of Cited Documents and Written Opinion).

*Primary Examiner* — Tri T Ton
(74) *Attorney, Agent, or Firm* — Oblon, McClelland, Maier & Neustadt, L.L.P.

(57) ABSTRACT

An optical cavity, includes: a set of elliptical mirrors, which are intended to receive light radiation emitted by a light source, the light radiation leaving the elliptical mirrors being intended to he received by a detector; a first common focal point and a second common focal point, which are shared by the set of the elliptical mirrors, the light source being intended to he arranged at the first common focal point, the detector being intended to be arranged at the second common focal point; a contour, comprising a part formed by the set of the elliptical mirrors which are arranged consecutively.

18 Claims, 2 Drawing Sheets

OPTICAL CAVITY WITH STRONG DYNAMIC

TECHNICAL FIELD

The invention relates to the technical field of optical cavities. The invention is particularly used in spectroscopic sensors. A spectroscopic sensor includes an optical cavity, a light source emitting light radiation, and a detector for the light radiation. The light source can be, for example, a thermal source or a quantum cascade laser. Possible uses are fluid sensors, particle sensors, biosensors, etc.

More precisely, it is possible to mention a nondispersive infrared (conventionally referred to as NDIR) sensor for detecting a fluid such as a gas. The infrared light source is preferentially a thermal source. "Infrared" means a wavelength between 0.78 μm and 12 μm. The infrared detector can be, for example, a bolometer or a pyrometer. The use preferentially envisaged is the detection of a gas, for example $CO_2$, in a reliable manner in an industrial environment, the detection conventionally being a threshold detection. Another possible use is the analysis of a gas, involving precise, selective and unstable quantitative measurements such as to obtain a composition analysis, or an individual detection of the $CO_2$ load of the breathed air. An NDIR sensor can be incorporated into a portable system such as a portable phone, a computer, a camera, etc. The invention can also be used in fixed systems for home automation, the analysis of the quality of interior and exterior air, industrial detectors, etc.

The operating principle of an NDIR sensor consists in measuring, via the infrared detector, the drop in light intensity when the gas to be detected is located inside the optical cavity. Indeed, the gas inside the optical cavity absorbs the infrared light at a wavelength specific (or over a spectral band specific) to the gas to be detected. For this purpose, when the light source is a thermal source, the infrared detector is conventionally supplied with a filter suitable for filtering said predetermined wavelength (or the spectral band).

For example, assuming a uniform distribution of the gas molecules, the Beer-Lambert law gives a formula for the transmittance T of light through a gas:

$$T = \exp(-\sigma N l)$$

where:
σ is the absorption cross-section of a gas molecule,
N is the number of gas molecules per volume unit,
l is the interaction length between the gas and the light.

By way of example, for $CO_2$, the interaction length I is preferentially between a few millimetres and a few tens of centimetres.

A compact NDIR sensor, that is inexpensive and has low electrical consumption, is sought. Since great compactness is sought, due to the high interaction length (which can reach a few tens of centimetres), it is not possible to use an optical cavity having a direct path between the light source and the infrared detector, including the presence of lenses. "Cavity having a direct path" means a cavity operating without a mirror (mirrors) that can fold the light beam.

BACKGROUND ART

It is also known to fold an optical cavity in the sense that at least one mirror is arranged in the optical cavity in order to guide light radiation emitted by a light source along an indirect path resulting from successive reflection(s) on the mirror or mirrors.

An optical cavity known from the prior art, particularly from the document DE 4102146, includes an elliptical mirror intended to reflect light radiation emitted by a light source. The light source is arranged at a focal point of the elliptical mirror, and a detector is arranged at the other focal point of the elliptical mirror. Thus, if the geometric optics model is considered, the light rays emitted by the light source pass through the optical cavity twice.

If $C_{min}$ is denoted as the minimum concentration of gas that can be detected, and $C_{max}$ is denoted as the maximum concentration of gas that can be detected, it is possible to show that $C_{min}$ and $C_{max}$ satisfy, for such an optical cavity of the prior art, the following relations:

$$C_{min} = \frac{1}{\alpha l \frac{P_0}{\varepsilon} \exp(-\beta l)}$$

$$C_{max} = \frac{\log\left(\frac{P_0}{\varepsilon}\right)}{\alpha l} - \frac{\beta}{\alpha}$$

where:
α (in $ppm^{-1}\ m^{-1}$) is the absorptivity of the gas at the considered wavelength of the light radiation,
β is an attenuation coefficient linked to the intrinsic losses of the optical cavity, without gas,
l (in m) is the interaction length between the gas and the light within the optical cavity,
$P_0$ is the intensity of the light radiation emitted by the source,
ε is the noise of the detector.

Such a cavity of the prior art is not entirely satisfactory in terms of extent of the detectable concentration area. A spectroscopic sensor is sought which has the widest possible detectable concentration area, i.e. a range $[C_{min}, C_{max}]$ that is as dynamic as possible.

DESCRIPTION OF THE INVENTION

The invention aims to overcome all or some of the aforementioned disadvantages. To this end, the object of the invention is an optical cavity, including:
- a set of elliptical mirrors, which are intended to receive light radiation emitted by a light source, the light radiation leaving the elliptical mirrors being intended to be received by a detector;
- a first common focal point and a second common focal point, which are shared by the set of the elliptical mirrors, the light source being intended to be arranged at the first common focal point, the detector being intended to be arranged at the second common focal point;
- a contour, comprising a part formed by the set of the elliptical mirrors which are arranged consecutively.

Thus, such an optical cavity according to the invention allows a more dynamic range $[C_{min}, C_{max}]$, with equal compactness, compared to the prior art, thanks to the first and second common focal points shared by the set of elliptical mirrors, the elliptical mirrors being arranged consecutively such as to form a part of the contour of the optical cavity. Indeed, the elliptical mirrors of the set having a small semi-major axis are used to detect the large concentrations of gas (absorption non-saturation) whereas the elliptical mirrors of the set having a large semi-major axis are used to detect the weak concentrations of gas (sufficiently long optical path for significantly absorbing the light).

Definitions

"Contour" means all of the surfaces outwardly delimiting the optical cavity.
"Consecutively" means that the set of the elliptical mirrors immediately follow one another, without interruption.

The optical cavity according to the invention can include one or more of the following features.

According to a feature of the invention, each elliptical mirror has a semi-major axis; and the elliptical mirrors are arranged consecutively such that the consecutive semi-major axes form a monotonic sequence.

Thus, an obtained advantage is ensuring continuous detection of the concentrations between two consecutive elliptical mirrors.

According to a feature of the invention, the elliptical mirrors are arranged consecutively from the first common focal point toward the second common focal point such that the monotonic sequence is strictly increasing.

Thus, an obtained advantage is avoiding the presence of zones blocking the light radiation leaving the elliptical mirrors. These blocking zones do not allow the light radiation to converge toward the detector, and lead to losses in luminous flux.

According to a feature of the invention, the monotonic sequence is a geometric sequence.

According to a feature of the invention, the geometric sequence has a ratio, denoted q, satisfying:

$$q = G \log(G)$$

where G is a constant.

According to a feature of the invention, the elliptical mirrors are arranged consecutively such as to form junctions, each junction extending along an axis passing through the first common focal point.

Thus, an obtained advantage is avoiding the presence of zones blocking the light radiation leaving the elliptical mirrors at the junctions.

According to a feature of the invention, the first and second common focal points define a straight line, and the axis along which each junction extends forms an angle with the straight line, which angle is denoted $\theta_i$ and orientated from the first common focal point toward the second common focal point, and satisfying:

$$\theta_i = \cos^{-1}\left(1 - \frac{2i}{N}\right), i \in [1, N]$$

where:
i is the i-th junction between two consecutive elliptical mirrors,
N is the number of elliptical mirrors.

Thus, an obtained advantage is that each elliptical mirror receives the same proportion of power of the light radiation, which is particularly advantageous for a Lambertian light source.

According to a feature of the invention, the optical cavity includes two opposite reflecting ends, which are suitable for reflecting the light radiation, and arranged on either side of the set of the elliptical mirrors such as to form a waveguide.

Thus, such reflecting ends form a waveguide arranged to guide the light radiation in the direction of the thickness of the optical cavity. It has been noted that it is always possible to conjugate the light source with the detector in the plane of the optical cavity, and this despite the additional presence of such a waveguide arranged in a direction perpendicular to the plane of the cavity. Thus, an advantage obtained by such reflecting ends is:
increasing the optical efficiency of the optical cavity compared to the prior art, or
making it possible to reduce the thickness of the optical cavity (gain in compactness) compared to the prior art for a same optical efficiency.

Yet, an optical cavity of the prior art makes it possible to obtain a compact sensor in the plane of the optical cavity, but not in the thickness of the optical cavity. Indeed, the thickness of the optical cavity is imposed by the thickness of the light source. A reduction in the thickness of the optical cavity leads to a reduction in the size of the light source, and simultaneously to a loss of optical efficiency. A possibility for compensation would be to increase the power of the light source, at the expense of the electrical consumption.

Another object of the invention is a spectroscopic sensor, including:
an optical cavity in accordance with the invention,
a light source, arranged at the first common focal point in order to emit light radiation;
a detector, arranged at the second common focal point for receiving the light radiation leaving the elliptical mirrors.

BRIEF DESCRIPTION OF THE DRAWINGS

Other features and advantages will appear in the detailed description of various embodiments of the invention, the description containing examples and references to the appended drawings.

Figure 1:
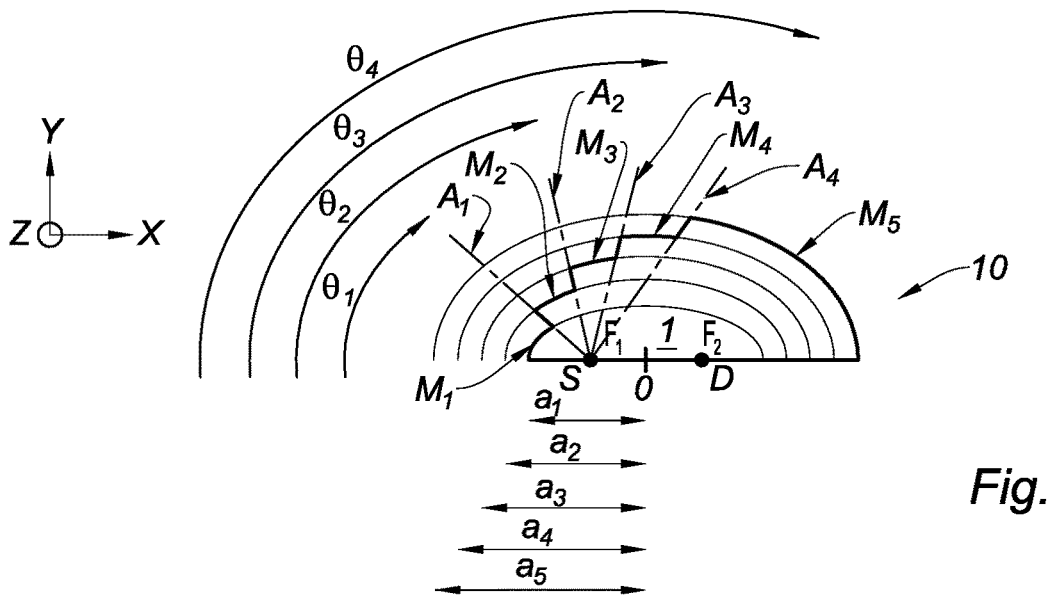
FIG. 1 is a cross-section schematic view of a spectroscopic sensor including an optical cavity according to a first embodiment of the invention. The construction lines of the ellipses are visible in order to improve understanding.

"Transversal" means a direction perpendicular to the direction (denoted Z) along the thickness of the optical cavity. The cutting plane is denoted (X, Y) in the figures, and corresponds to the plane of the optical cavity.

DETAILED DESCRIPTION OF THE EMBODIMENTS

The elements that are identical or provide the same function will have the same references for the various embodiments, for the sake of simplification.

An object of the invention is an optical cavity 1, including:
a set of elliptical mirrors $M_1$ to $M_6$, which are intended to receive light radiation 2 emitted by a light source S, the light radiation 2 leaving the elliptical mirrors $M_1$ to $M_6$ being intended to be received by a detector D;

a first common focal point $F_1$ and a second common focal point $F_2$, which are shared by the set of the elliptical mirrors $M_1$ to $M_6$, the light source S being intended to be arranged at the first common focal point $F_1$, the detector D being intended to be arranged at the second common focal point $F_2$;

a contour, comprising a part formed by the set of the elliptical mirrors $M_1$ to $M_6$ which are arranged consecutively.

Elliptical Mirrors

Each elliptical mirror $M_1$ to $M_6$ forms an ellipse portion. Each elliptical mirror $M_1$ to $M_6$ has a semi-major axis, denoted $a_i$, i being between 1 and N, where N is the number of elliptical mirrors. N is a natural number greater than or equal to 2, preferably greater than or equal to 3.

Each elliptical mirror $M_1$ to $M_6$ advantageously has a reflection coefficient for the light radiation 2 greater than or equal to 75% for any angle of incidence. Said reflection coefficient is advantageously greater than or equal to 80%, preferentially greater than or equal to 85%, more preferentially greater than or equal to 90%, for any angle of incidence. Advantageously, the reflection coefficient for the light radiation 2 is greater than or equal to 95%, preferably greater than or equal to 98% for any angle of incidence less than 45°. "Reflection coefficient" means the intensity reflection coefficient, for an angle of incidence between 0° (normal incidence) and 90° (grazing incidence), for a given wavelength, and taking into account the polarizations "s" and "p" arithmetically averaged when the light source S is a thermal source. The angle of incidence is the angle between the direction of propagation of the light radiation 2 and the normal to the reflecting surface of the corresponding elliptical mirror.

The elliptical mirrors $M_1$ to $M_6$ are advantageously arranged consecutively such that the consecutive semi-major axes form a monotonic sequence. The monotonic sequence is advantageously strictly increasing. The monotonic sequence is advantageously a geometric sequence. Thus, the consecutive semi-major axes satisfy:

$$a_{n+1} = q\, a_n$$

where q is the ratio of the geometric sequence, and n is a natural number between 1 and (N−1).

The geometric sequence advantageously has a ratio, denoted q, satisfying:

$$q = G \log(G)$$

where G is a constant. G is advantageously proportional to $P_0/\varepsilon$, preferentially approximately $P_0/\varepsilon$, where:

$P_0$ is the intensity of the light radiation emitted by the light source S, $\varepsilon$ is the noise of the detector D.

As the set of the elliptical mirrors $M_1$ to $M_6$ shares the first and second common focal points $F_1$, $F_2$, the distance (denoted c) between the centre of the corresponding ellipses and a focal point is constant. The semi-minor axes of the set of the elliptical mirrors $M_1$ to $M_6$ (denoted $b_i$, i being between 1 and N) satisfy the following relation:

$$b_i = \sqrt{a_i^2 - c^2}$$

Figure 2:
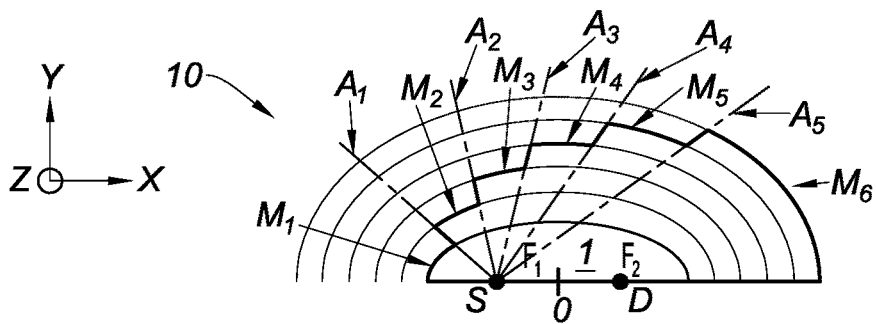
FIGS. 2 to 5 are views similar to FIG. 1, illustrating an optical cavity according to various embodiments of the invention.

As illustrated in FIGS. 1 and 2, the elliptical mirrors $M_1$ to $M_6$ are advantageously arranged consecutively from the first common focal point $F_1$ toward the second common focal point $F_2$ such that the geometric sequence is strictly increasing.

Figure 3:
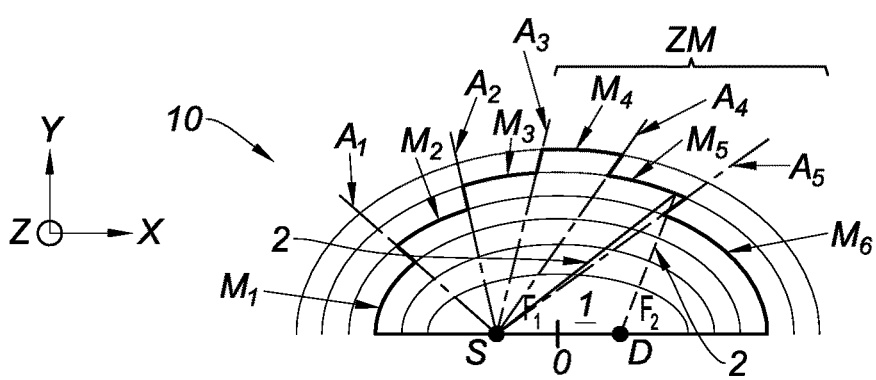
Figure 4:
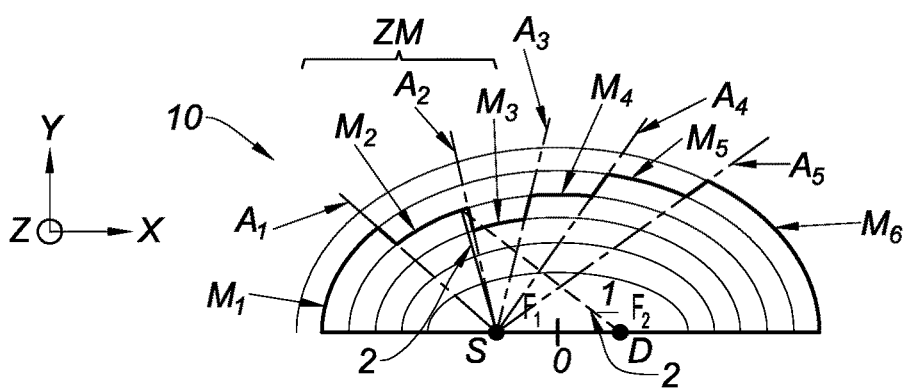

In FIGS. 3 and 4, the arrangement of the elliptical mirrors $M_1$ to $M_6$ is not optimal insofar as blocking zones ZM for the light radiation 2 appear when consecutive terms of the geometric sequence decrease from the first common focal point $F_1$ toward the second common focal point $F_2$.

Figure 5:
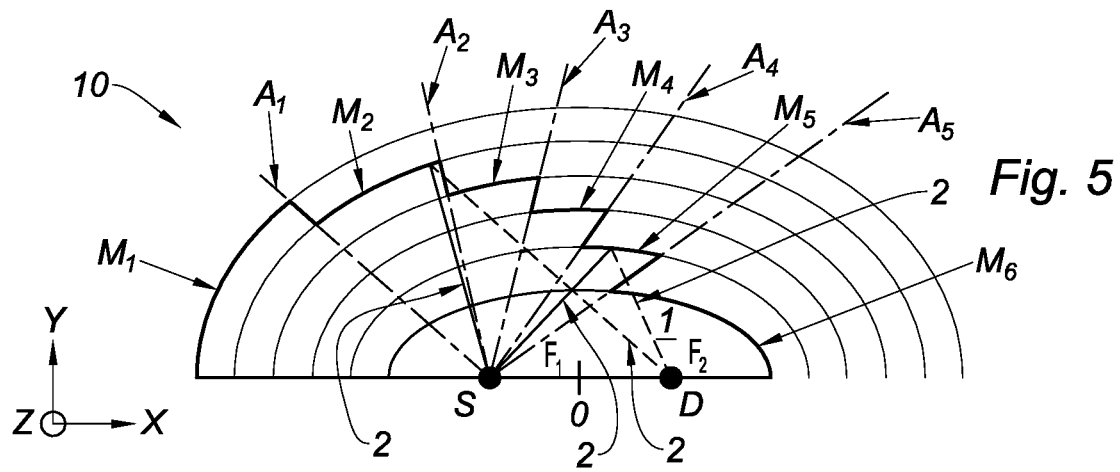

In FIG. 5, the elliptical mirrors $M_1$ to $M_6$ are arranged consecutively from the first common focal point $F_1$ toward the second common focal point $F_2$ such that the geometric sequence is strictly decreasing. This arrangement is the most unfavourable in terms of losses of luminous flux due to the blocking of the light radiation 2.

The elliptical mirrors $M_1$ to $M_6$ are arranged consecutively such as to form junctions, each junction advantageously extending along an axis $A_1$ to $A_5$ passing through the first common focal point $F_1$.

The first and second common focal points $F_1$, $F_2$ define a straight line, and the axis $A_1$ to $A_5$ along which each junction extends forms an angle with the straight line, which angle is denoted $\theta_i$ and orientated from the first common focal point $F_1$ toward the second common focal point $F_2$, and advantageously satisfying:

$$\theta_i = \cos^{-1}\left(1 - \frac{2i}{N}\right),\ i \in [1, N]$$

where:

i is the i-th junction between two consecutive elliptical mirrors $M_1$ to $M_6$, N is the number of elliptical mirrors $M_1$ to $M_6$.

Embodiment Example

Figure 6:
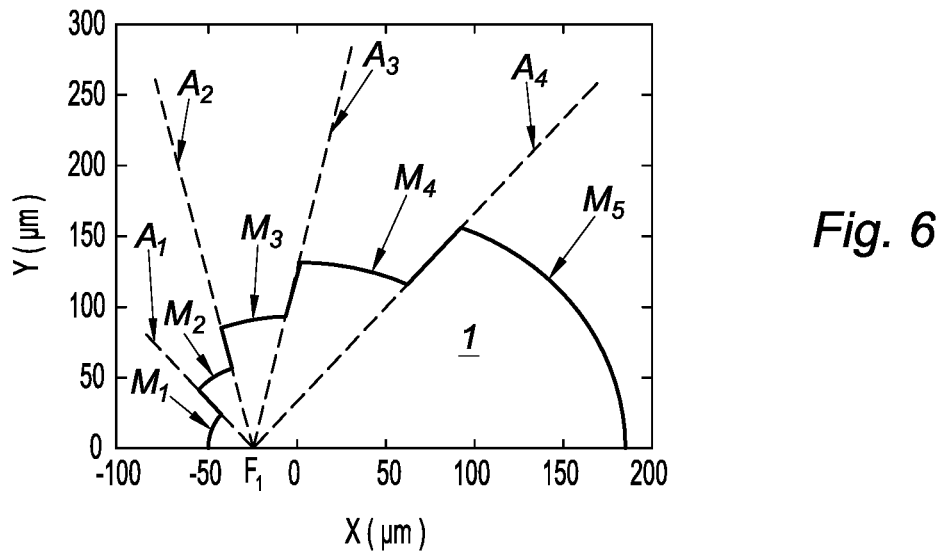
FIG. 6 is a graph illustrating the dimensions (in microns) of an optical cavity according to an embodiment of the invention.

In the example illustrated in FIG. 6, the set of elliptical mirrors includes five elliptical mirrors $M_1$ to $M_5$ (N=5). The elliptical mirrors $M_1$ to $M_5$ are arranged consecutively from the first common focal point $F_1$ toward the second common focal point $F_2$ such that the consecutive semi-major axes form a strictly increasing geometric sequence, satisfying:

$$a_{n+1} = q\, a_n$$

where:

n is a natural number between 1 and N−1, namely a natural number between 1 and 4, the semi-major axis of the elliptical mirror $M_1$ satisfies: $A_1 = 50\ \mu m$, q is the ratio of the geometric sequence satisfying: $q = G \log(G)$, with G=2.

FDTD ("Finite Difference Time Domain") simulations have been carried out with a wavelength (denoted $\lambda$) of the light radiation 2 equal to 4.5 μm. The optical cavity 1 is immersed in a fictitious medium, representing a gas, the refractive index real part of which is equal to 1, and the refractive index imaginary part of which is denoted $k_{gaz}$ and satisfies:

$$k_{gaz} = \frac{\lambda}{4\pi} \alpha C$$

where:

$\alpha$ is the absorptivity of the gas at the considered wavelength of the light radiation 2, C is the concentration of the gas in the optical cavity 1.

Figure 7:
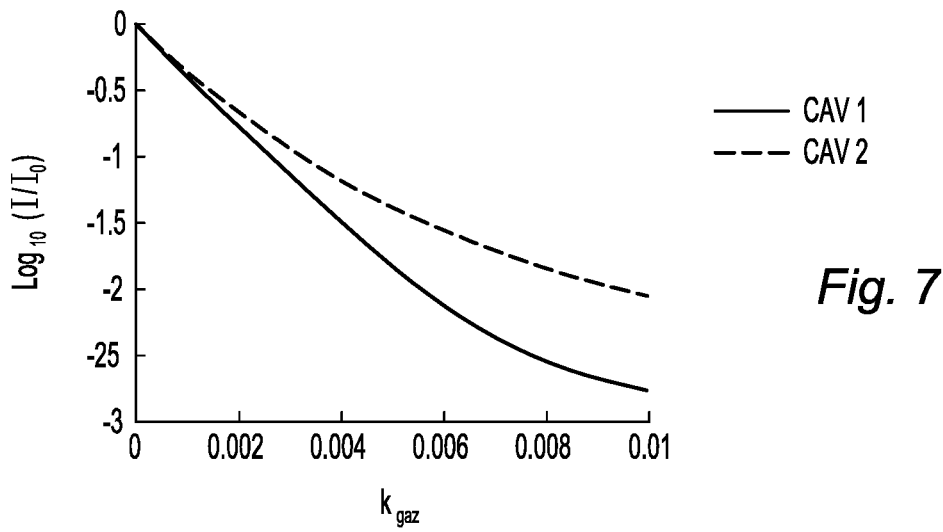
FIG. 7 is a graph showing, in the y-axis, the intensity attenuation of a light signal received by the detector and, in the x-axis, the imaginary part of the refractive index of the gas, for an optical cavity of the prior art (CAV1) and for an optical cavity according to the invention (CAV2).

As illustrated in FIG. 7, a comparison has been carried out for the intensity attenuation of a light signal, emitted by the light source S, and received by the detector D between an optical cavity of the prior art (CAV1) and the optical cavity 1 according to the invention (CAV2), with equal compactness, i.e. with the same rectangular surface in which the ellipse of the prior art is inscribed. The FDTD simulations show that the optical cavity 1 according to the invention:

saturates less, in absorption, for the strong concentrations of gas ($k_{gas}$ high), has a comparable sensitivity for the weak concentrations of gas ($k_{gas}$ weak), the sensitivity being linked to the slope of the curve at the origin.

As a result, the optical cavity 1 according to the invention allows a more dynamic range [$C_{min}$, $C_{max}$], with equal compactness, compared to the prior art.

Waveguide

The optical cavity 1 advantageously includes two opposite reflecting ends (not visible in the figures), which are suitable for reflecting the light radiation 2, and arranged on either side of the set of the elliptical mirrors $M_1$ to $M_6$ such as to form a waveguide. The two reflecting ends guide the light radiation 2 in the direction Z of the thickness of the optical cavity 1. The set of the elliptical mirrors $M_1$, $M_2$, $M_3$ connect the two reflecting ends.

Each reflecting end includes a reflecting surface having a reflection coefficient for the light radiation 2 that is greater than or equal to 80%, preferably greater than or equal to 85%, more preferentially greater than or equal to 90%, for any angle of incidence. Advantageously, the reflection coefficient for the light radiation 2 is greater than or equal to 95%, preferably greater than or equal to 98% for any angle of incidence less than 45°. "Reflection coefficient" means the intensity reflection coefficient, for an angle of incidence between 0° (normal incidence) and 90° (grazing incidence), for a given wavelength, and taking into account the polarizations "s" and "p" arithmetically averaged when the light source S is a thermal source. The angle of incidence is the angle between the direction of propagation of the light radiation 2 and the normal to the reflecting surface of the corresponding reflecting end. The reflecting surface of each reflecting end is preferentially planar. The reflecting surfaces, which are planar, of the reflecting ends are advantageously parallel.

The reflecting surface of each reflecting end is preferentially produced from a metal material. The metal material is preferentially selected from the group including gold, silver, aluminium and copper. The reflecting surface of each reflecting end is advantageously coated with a layer for protecting against corrosion of the metal material. The protective layer is advantageously produced from a material selected from the group including $SiO_2$, SiN, $Si_3N_4$, a DLC (diamond-like carbon) amorphous carbon, polytetrafluoroethylene (PTFE), Pt, TiN.

The two reflecting ends are preferentially each produced in the form of a plate. The plates are advantageously supplied with openings shaped to receive the light source S and the detector D when the plates are brought into contact and fixed to one another. The two reflecting ends advantageously form planar mirrors.

Manufacture of the Optical Cavity

A first method for manufacturing an optical cavity 1 according to the invention includes the steps of:

a) providing first and second substrates of a material, the material being preferably semi-conductive, more preferentially silicon;

b) hollowing each of the first and second substrates such as to form a bottom and retain a surface part;

c) assembling the first and second substrates such that:
the surface parts retained during the step b) form the set of the elliptical mirrors $M_1$ to $M_6$,
the bottoms form the opposite reflecting ends of the optical cavity 1.

The step b) is advantageously carried out by deep reactive-ion etching. The step b) preferentially includes a prior step consisting in depositing a photosensitive resin at the surface of the first and second substrates. Then, the recesses can be obtained by photolithography and etching steps. The step b) is advantageously carried out such that the obtained recesses make it possible to form planar bottoms. The fact of hollowing two substrates, instead of one, during the step b) makes it possible to increase the thickness of the optical cavity 1 formed during the step c) in order to reduce the optical losses by reflection.

The reflecting surface of the reflecting ends is advantageously formed by depositing a metal material on the bottoms of the first and second substrates, the depositing being preferably carried out by cathode sputtering. The depositing of the metal material can also be carried out by vacuum evaporation or by electrolysis. The depositing of the metal material is carried out before the step c).

The reflecting surfaces of the elliptical mirrors $M_1$ to $M_6$ are advantageously formed by depositing a metal material on a lateral edge of a surface part, the depositing being preferably carried out by cathode sputtering. The depositing of the metal material can also be carried out by vacuum evaporation or by electrolysis. The depositing of the metal material is carried out before the step c).

Thus, the recesses of the first and second substrates obtained during the step b) make it possible to obtain two half-cavities. The optical cavity 1 is formed during the step c) by assembling the first and second substrates in order to bring together the two half-cavities. The step c) can be carried out by bonding of eutectic seal type. The fact of forming a recess, for example by reactive-ion etching, in a substrate of a semiconductor material is an inexpensive and viable solution since the obtained inclination of the surface parts relative to the normal to the first and second substrates is typically approximately 1° to 2°.

A second method for manufacturing an optical cavity 1 according to the invention includes the steps of:

a) providing first and second moulds including an impression of first and second pieces, respectively, each including a base topped by a surface part;

b) injecting a plastic into the first and second moulds such as to obtain the first and second pieces;

c) assembling the first and second pieces such that:
the surface parts form the set of the elliptical mirrors $M_1$ to $M_6$,
the bases form the opposite reflecting ends of the optical cavity 1.

The step a) is preferably carried out such that the first and second moulds each include a fixed part and a mobile part. The step b) is preferably carried out with an injection press.

The reflecting surface of the reflecting ends is advantageously formed by depositing a metal material on the bases of the first and second substrates, the depositing being preferably carried out by cathode sputtering. Depositing the metal material can also be carried out by vacuum evaporation or by electrolysis. Depositing the metal material is carried out before the step c).

The reflecting surfaces of the elliptical mirrors $M_1$ to $M_6$ are advantageously formed by depositing a metal material on a lateral edge of a surface part, the depositing being preferably carried out by cathode sputtering. The depositing of the metal material can also be carried out by vacuum evaporation or by electrolysis. The depositing of the metal material is carried out before the step c).

Thus, the optical cavity 1 is formed during the step c) by assembling the first and second pieces in order to bring together two half cavities each delimited by the base and the corresponding surface part. Plastic injection is an inexpensive and viable solution insofar as the shape defects are not detrimental for correctly imaging the light source S on the detector D.

Sensor

An object of the invention is a spectroscopic sensor 10, including:
- an optical cavity 1 in accordance with the invention,
- a light source S, arranged at the first common focal point $F_1$ in order to emit light radiation 2,
- a detector D, arranged at the second common focal point $F_2$ in order to receive the light radiation 2 exiting the elliptical mirrors $M_1$ to $M_6$.

The spectroscopic sensor 10 can be an infrared (e.g. non-dispersive) sensor for detecting a fluid such as a gas. As nonlimiting examples, the gas can be selected from the group including carbon monoxide, carbon dioxide, at least one hydrocarbon, a hydrochlorofluorocarbon, a chlorofluorocarbon, nitrogen monoxide, nitrogen dioxide, sulphur dioxide, and ozone. The gas can also be selected from the following gases, absorbing in an absorption spectral band between 0.78 µm and 12 µm:

$HF$, $HCl$, $SO_3$, $HBr$, $H_2S$, $COS$, $C_2H_6$, $C_3H_8$, $C_4H_{10}$, $COCl_2$, $BF_3$, $CH_4$, $HNO_3$, a volatile organic compound (e.g. $C_6H_6$, $CH_3COCH_3$), $B_2H_6$, $CO$, $CS_2$, $HCN$, $WF_6$, $N_2O$, $NH_3$, $AsH_3$, a polycyclic aromatic hydrocarbon, benzene, toluene, the three isomers of xylene, $C_2H_4O$, $BCl_3$.

The spectroscopic sensor 10 can also be a particle sensor, or a biosensor.

In the case of a particle sensor, the light source S preferentially emits in the visible range. The light source S can be of LED type. The operating principle is as follows. The particles generate waves diffused in the optical cavity 1 at random angles, which will not be refocused as far as the detector D due to successive absorptions particularly by the elliptical mirrors $M_1$ to $M_6$. This loss in transmission measured by the detector D reveals the type (index, size) and the concentration of the particles insofar as the particles are not generally intrinsically absorbent.

Light Source

As nonlimiting examples, the light source S can be a thermal source or a quantum cascade laser. The light source S can be an infrared source. The light source S advantageously includes an element, for example of filament type, in which an electric current is circulated such that the element heats up and emits infrared radiation. The element has a dimension, denoted e, along the thickness of the optical cavity 1 preferentially satisfying:

100 µm≤e≤E≤1.5 mm, more preferentially 250 µm≤e≤E≤1200 µm where E is the thickness of the optical cavity 1.

The element preferentially has the shape of a disk having a circular surface, with a diameter of 250 µm (corresponding to the dimension e). The axis of the light source S is defined as the normal to the circular surface. By way of nonlimiting example, the disk can have a thickness of 400 nm along the axis of the light source S. The image of the light source S (i.e. the disk-shaped element) is a rectangle having a width of 250 µm and a height of 600 µm (the height corresponding to the direction Z along the thickness of the optical cavity 1).

Detector

The detector D can be an infrared detector. The infrared detector can be, for example, a bolometer or a pyrometer. The infrared detector can have an infrared-sensitive surface. By way of nonlimiting example, the sensitive surface can have the shape of a square with 600 µm sides. The detector D is preferentially equipped with a band-pass optical filter, centred on the absorption spectral band of the gas to be detected if required, when the light source S is a thermal source. The detector D advantageously extends according to Z, over the entire thickness of the optical cavity 1, such as to receive maximum light radiation, the conjugation of the first and second common focal points $F_1$, $F_2$ of the elliptical mirrors $M_1$ to $M_6$ being imperfect according to Z.

In the case of a spectroscopic sensor 10 of particle sensor type with a light source S emitting in the visible range, the detector D is advantageously a silicon-based photodiode.

The invention is not limited to the described embodiments. A person skilled in the art is able to consider the technically effective combinations thereof, and to substitute them with equivalents.

The invention claimed is:

1. An optical cavity, including:
   a set of elliptical mirrors arranged to receive light radiation emitted by a light source;
   a first common focal point and a second common focal point which are shared by the set of the elliptical mirrors, the cavity being adapted to receive the light source at the first common focal point and adapted receive a detector at the second common focal point, and light leaving the mirrors being directed to the second common focal point;
   a contour, comprising a part formed by the set of the elliptical mirrors which are arranged consecutively,
   wherein the elliptical mirrors are arranged so as to form junctions, each junction extending along an axis passing through the first common focal point.

2. The optical cavity according to claim 1, wherein each elliptical mirror has a semi-major axis and wherein the elliptical mirrors are arranged consecutively such that the consecutive semi-major axes form a monotonic sequence.

3. The optical cavity according to claim 2, wherein the elliptical mirrors are arranged consecutively from the first common focal point toward the second common focal point such that the monotonic sequence is strictly increasing.

4. The optical cavity according to claim 2, wherein the monotonic sequence is a geometric sequence.

5. The optical cavity according to claim 4, wherein the geometric sequence has a ratio, denoted q, satisfying:

$$q = G \log(G)$$

where G is a constant.

6. The optical cavity according to claim 1, wherein the first and second common focal points define a straight line, and the axis along which each junction extends forms an angle with the straight line, which angle is denoted $\theta_i$ and orientated from the first common focal point toward the second common focal point and satisfying:

$$\theta_i = \cos^{-1}\left(1 - \frac{2i}{N}\right), i \in [1, N]$$

where:
i is an i-th junction between two consecutive elliptical mirrors, and
N is a number of elliptical mirrors.

7. The optical cavity according to claim 1, including two opposite reflecting ends, configured to reflect the light radiation and arranged on either side of the set of the elliptical mirrors so as to form a waveguide.

8. A spectroscopic sensor, including:
an optical cavity according to claim 1,
the light source arranged at the first common focal point in order to emit the light radiation; and
the detector arranged at the second common focal point for receiving the light leaving the elliptical mirrors.

9. The optical cavity according to claim 3, wherein the monotonic sequence is a geometric sequence.

10. The optical cavity according to claim 2, wherein the first and second common focal points define a straight line, and the axis along which each junction extends forms an angle with the straight line, which angle is denoted $\theta_i$, and orientated from the first common focal point toward the second common focal point, and satisfying:

$$\theta_i = \cos^{-1}\left(1 - \frac{2i}{N}\right), i \in [1, N]$$

where:
i is an i-th junction between two consecutive elliptical mirrors, and
N is a number of elliptical mirrors.

11. The optical cavity according to claim 3, wherein the first and second common focal points define a straight line, and the axis along which each junction extends forms an angle with the straight line, which angle is denoted $\theta_i$, and orientated from the first common focal point toward the second common focal point, and satisfying:

$$\theta_i = \cos^{-1}\left(1 - \frac{2i}{N}\right), i \in [1, N]$$

where:
i is an i-th junction between two consecutive elliptical mirrors, and
N is a number of elliptical mirrors.

12. The optical cavity according to claim 4, wherein the first and second common focal points define a straight line, and the axis along which each junction extends forms an angle with the straight line, which angle is denoted $\theta_i$, and orientated from the first common focal point toward the second common focal point, and satisfying:

$$\theta_i = \cos^{-1}\left(1 - \frac{2i}{N}\right), i \in [1, N]$$

where:
i is an i-th junction between two consecutive elliptical mirrors, and
N is a number of elliptical mirrors.

13. The optical cavity according to claim 5, wherein the first and second common focal points define a straight line, and the axis along which each junction extends forms an angle with the straight line, which angle is denoted $\theta_i$, and orientated from the first common focal point toward the second common focal point, and satisfying:

$$\theta_i = \cos^{-1}\left(1 - \frac{2i}{N}\right), i \in [1, N]$$

where:
i is an i-th junction between two consecutive elliptical mirrors, and
N is a number of elliptical mirrors.

14. The optical cavity according to claim 2, including two opposite reflecting ends, configured to reflect the light radiation and arranged on either side of the set of the elliptical mirrors so as to form a waveguide.

15. The optical cavity according to claim 3, including two opposite reflecting ends, configured to reflect the light radiation and arranged on either side of the set of the elliptical mirrors so as to form a waveguide.

16. The optical cavity according to claim 4, including two opposite reflecting ends, configured to reflect the light radiation and arranged on either side of the set of the elliptical mirrors so as to form a waveguide.

17. The optical cavity according to claim 5, including two opposite reflecting ends, configured to reflect the light radiation and arranged on either side of the set of the elliptical mirrors so as to form a waveguide.

18. The optical cavity according to claim 6, including two opposite reflecting ends, configured to reflect the light radiation and arranged on either side of the set of the elliptical mirrors so as to form a waveguide.

\* \* \* \* \*